United States Patent
Mukherjee et al.

(10) Patent No.: US 8,769,308 B2
(45) Date of Patent: Jul. 1, 2014

(54) HOME (E)NODE-B WITH NEW FUNCTIONALITY

(75) Inventors: Rajat P. Mukherjee, Montreal (CA); Shankar Somasundaram, Deer Park, NY (US); Ulises Olvera-Hernandez, Kirkland (CA); Yogendra C. Shah, Exton, PA (US); Prabhakar R. Chitrapu, Blue Bell, PA (US); Inhyok Cha, Yardley, PA (US)

(73) Assignee: Interdigital Technology Corporation, Wilmington, DE (US)

( * ) Notice: Subject to any disclaimer, the term of this patent is extended or adjusted under 35 U.S.C. 154(b) by 1281 days.

(21) Appl. No.: 12/111,259

(22) Filed: Apr. 29, 2008

(65) Prior Publication Data

US 2008/0267114 A1     Oct. 30, 2008

Related U.S. Application Data

(60) Provisional application No. 60/915,078, filed on Apr. 30, 2007, provisional application No. 60/940,557, filed on May 29, 2007.

(51) Int. Cl.
| | | |
|---|---|---|
| G06F 11/30 | (2006.01) | |
| G06F 12/14 | (2006.01) | |
| H04L 9/32 | (2006.01) | |
| H04L 12/66 | (2006.01) | |

(52) U.S. Cl.
USPC ............ 713/193; 713/170; 709/229; 370/352

(58) Field of Classification Search
USPC ................ 713/193, 168–174, 182–186, 202; 701/213, 215; 709/225, 229; 726/2–8
See application file for complete search history.

(56) References Cited

U.S. PATENT DOCUMENTS

| | | |
|---|---|---|
| 6,430,195 B1 | 8/2002 | Christie et al. |
| 2003/0120920 A1 | 6/2003 | Svensson |
| 2003/0204610 A1* | 10/2003 | Howard et al. ............... 709/229 |
| 2003/0233328 A1* | 12/2003 | Scott et al. ...................... 705/50 |
| 2004/0185859 A1 | 9/2004 | Barkan |
| 2005/0108171 A1 | 5/2005 | Bajikar et al. |
| 2005/0289347 A1 | 12/2005 | Ovadia |
| 2006/0154647 A1 | 7/2006 | Choi |
| 2006/0200670 A1* | 9/2006 | Kuffel et al. .................. 713/170 |
| 2006/0268796 A1 | 11/2006 | Watanbe |

(Continued)

FOREIGN PATENT DOCUMENTS

| | | |
|---|---|---|
| EP | 1 560 451 | 8/2005 |
| JP | 2003-249944 A | 9/2003 |

(Continued)

OTHER PUBLICATIONS

Deepak, "Femtocells: Definition, Issues and Market Potential", Design Line, Retrieved from http://www.mobilehandsetdesignline.com/howto/206902713;jsessionid=TD5CB3JSG1R1WQSNDLQCKH0CJUN N2JVN?pgno=2, (Last Update on Mar. 7, 2008).

(Continued)

*Primary Examiner* — Evans Desrosiers
(74) *Attorney, Agent, or Firm* — Condo Roccia Koptiw LLP

(57) ABSTRACT

A wireless communication device is configured as an in-home node-B (H(e)NB). The H(e)NB is configured to perform a locking function to control modification of carrier and user controlled parameters, and also configured to detect a change in location.

36 Claims, 4 Drawing Sheets

(56) References Cited

U.S. PATENT DOCUMENTS

| | | | |
|---|---|---|---|
| 2007/0030841 A1* | 2/2007 | Lee et al. | 370/352 |
| 2007/0110009 A1* | 5/2007 | Bachmann et al. | 370/338 |
| 2008/0080399 A1 | 4/2008 | Wang et al. | |
| 2008/0153533 A1* | 6/2008 | Claussen et al. | 455/522 |

FOREIGN PATENT DOCUMENTS

| | | |
|---|---|---|
| JP | 2006-191639 A | 7/2006 |
| JP | 2007-026037 A | 2/2007 |
| JP | 2007-089006 A | 4/2007 |
| RU | 2197785 C2 | 1/2003 |
| WO | WO 98/23056 A1 | 5/1998 |
| WO | 2005/096654 | 10/2005 |
| WO | WO 2006/128080 A2 | 11/2006 |

OTHER PUBLICATIONS

Ericsson, "LTE Home NB Text Proposal", 3GPP TSG RAN WG3 Meeting #55bis, R3-070714, (St. Julian's, Malta, Mar. 27-30, 2007).

Third Generation Partnership Project, "Technical Specification Group Radio Access Network; Evolved Universal Terrestrial Radio Access (E-UTRA) and Evolved Universal Terrestrial Radio Access network (E-UTRAN); Overall Description; Stage 2 (Release 8)", 3GPP TS 36.300, V8.0.0 (Mar. 2007).

Third Generation Partnership Project, "Technical Specification Group Radio Access Network; Evolved Universal Terrestrial Radio Access (E-UTRA) and Evolved Universal Terrestrial Radio Access network (E-UTRAN); Overall Description; Stage 2 (Release 8)", 3GPP TS 36.300, V8.4.0 (Mar. 2008).

Third Generation Partnership Project, "Technical Specification Group Core Network and Terminals; Mobile radio interface Layer 3 specification; Core network protocols; Stage 3 (Release 7)", 3GPP TS 24.008 V7.7.0 (Mar. 2007).

Third Generation Partnership Project, "Technical Specification Group Core Network and Terminals; Mobile radio interface Layer 3 specification; Core network protocols; Stage 3 (Release 7)", 3GPP TS 24.008 V7.8.0 (Jun. 2007).

Third Generation Partnership Project, "Technical Specification Group Core Network and Terminals; Mobile radio interface Layer 3 specification; Core network protocols; Stage 3 (Release 7)", 3GPP TS 24.008 V7.11.0 (Mar. 2008).

Third Generation Partnership Project, "Technical Specification Group Core Network and Terminals; Mobile radio interface Layer 3 specification; Core network protocols; Stage 3 (Release 8)", 3GPP TS 24.008 V8.1.0 (Mar. 2008).

Third Generation Partnership Project, "Technical Specification Group Services and System Aspects; Feasibility Study on Remote Management of USIM Application on M2M Equipment; (Release 8)", 3GPP TR 33.812 V0.0.2 (Oct. 2007).

Third Generation Partnership Project, "Technical Specification Group Services and System Aspects; Feasibility Study on Remote Management of USIM Application on M2M Equipments; (Release 8)", 3GPP TR 33.812 V0.2.2 (Mar. 2008).

Third Generation Partnership Project, "Technical Specification Group Services and System Aspects; Study on Facilitating Machine to Machine Communication in 3GPP Systems; (Release 8)", 3GPP TR 22.868 V8.0.0 (Mar. 2007).

Deepak, "Femtocells: Definition, Issues and Market Potential", Design Line, Retrieved from http://www.mobilehandsetdesignline.com/howto/206902173;jsessionid=TD5CB3JSG1R1WQSNDLQCKH0CJUNN2JVN?pgno=2, (Last update on Mar. 7, 2008).

Third Generation Partnership Project, "Technical Specification Group Services and System Aspects; Feasibility Study on Remote Management of USIM Application on M2M Equipment; (Release 8)", 3GPP TR 33.812 V0.2.2 (Mar. 2008).

Engadget, "Hands-on with the Samsung Ubicell", http://www.engadget.com/2007/03/28/hands-on-with-the-samsung-ubicell/, Mar. 28, 2007, accessed Jan. 16, 2012, 3 pages.

* cited by examiner

HOME (E)NODE-B WITH NEW FUNCTIONALITY

CROSS REFERENCE TO RELATED APPLICATIONS

This application claims the benefit of U.S. Provisional Application Ser. No. 60/915,078 filed on Apr. 30, 2007, and Ser. No. 60/940,557 filed on May 29, 2007 which are incorporated by reference as if fully set forth.

FIELD OF INVENTION

The application relates to wireless communication networks, and more particularly, to an advanced in-home (e)Node-B (H(e)NB).

BACKGROUND

A goal of the Third Generation Partnership Project (3GPP) Long Term Evolution (LTE) program is to develop new technology, new architecture and new methods for LTE settings and configurations in order to provide improved spectral efficiency, reduced latency, and better utilization of radio resources for faster user experiences and richer applications and services with less cost. As part of these efforts, the 3GPP has introduced the concept of an in-home, evolved node B (called H(e)NB) for LTE networks. 3GPP is also considering the in-home NB (called HNB) for Release 8 wideband code division multiple access (WCDMA). The acronym H(e)NB is used in this application to refer to both a H(e)NB and a HNB.

The in-home (e)NB (H(e)NB) is preferably similar to a wireless local area network (WLAN) access point (AP). It gives users access to LTE services (it may also provide Wideband Code Division Multiple Access (WCDMA), Global System for Mobile Communication (GSM) Edge Radio Access Network (GERAN), and other cellular services) over extremely small service areas such as homes and small offices. This can be particularly useful in areas where LTE has not been deployed and/or legacy 3GPP radio access technology (RAT) coverage already exists. This may also be useful in areas where cellular services have yet to be deployed, or where coverage may be faint or non-existent for radio related reasons, such as in an underground metro or shopping mall. The subscriber, whether an individual or an organization, will be able to deploy a H(e)NB in an area where such service is desired. FIG. 1 shows an example of a possible H(e)NB deployment.

Several issues should be addressed regarding the use of an H(e)NB. H(e)NB mobility is a potential problem. An H(e)NB could easily change location. A new location may pose a challenge if, for example, the operator who originally provided the H(e)NB did not offer coverage at the new location, thus a user may need to use a different operator and follow a location update procedure. An H(e)NB preferably would include high-level functions to implement detection of its own mobility as well as functions to implement other operator restrictions. All of this must be accomplished in a cost effective manner.

SUMMARY

An in-home node-B (H(e)NB) configured to perform a locking function to control modification of carrier and user controlled parameters, and also configured to detect a change in location.

BRIEF DESCRIPTION OF THE DRAWING

A more detailed understanding of the invention may be had from the following description of a preferred embodiment, given by way of example and to be understood in conjunction with the accompanying drawing wherein.

DETAILED DESCRIPTION OF THE PREFERRED EMBODIMENT(S)

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment. When referred to hereafter, the terminology "user" is interchangeable with "subscriber." When referred to hereafter, the terminology "operator" is interchangeable with "carrier," "wireless provider," and "wireless carrier." When referred to hereafter, the terminology "memory" refers to any computer-readable storage medium, examples of which include a read only memory (ROM), a random access memory (RAM), a nonvolatile random access memory (NVRAM), a register, cache memory, semiconductor memory devices, magnetic media such as internal hard disks and removable disks, magneto-optical media, and optical media such as CD-ROM disks, and digital video disks (DVDs). When referred to hereafter, the terminology "controlled" is interchangeable with "configurable." When referred to hereafter, the terminology "parameter" and "characteristic" are equivalent.

Figure 2:
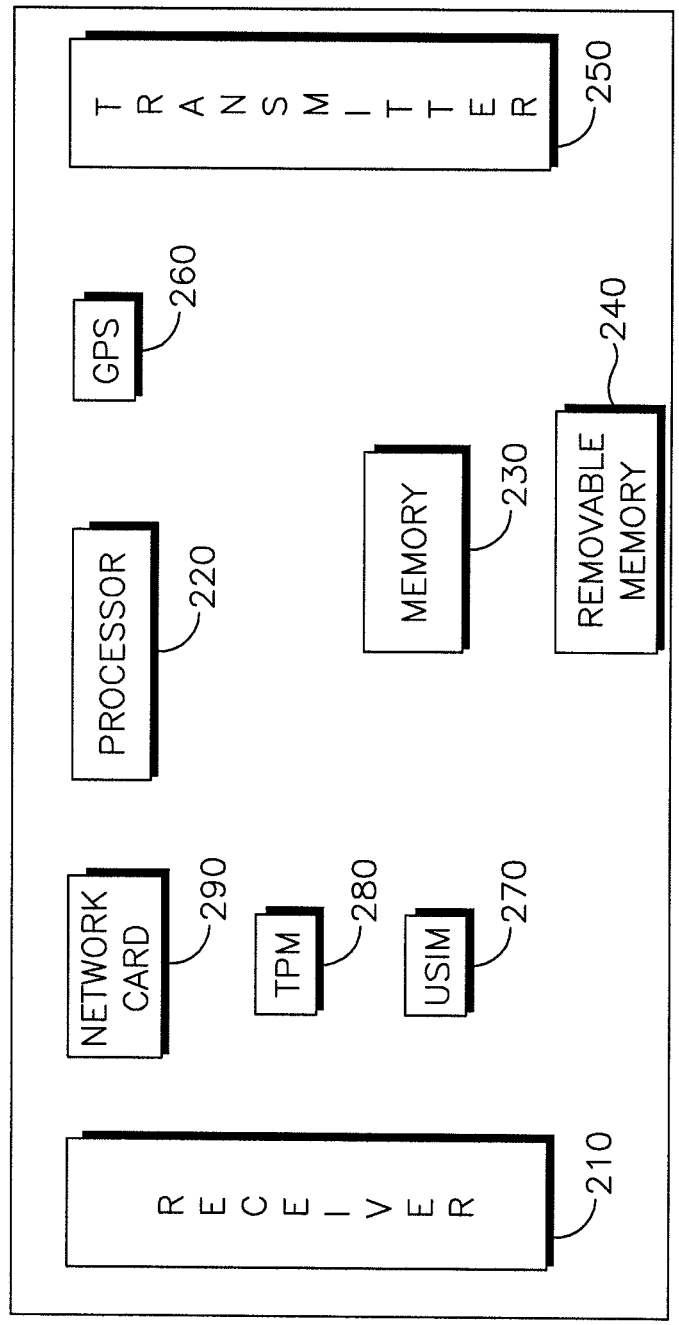
FIG. 2 illustrates an example embodiment of a H(e)NB and its respective components.

FIG. 2 depicts an example embodiment of a H(e)NB 200 comprising a receiver 210, a processor 220, a memory 230, a removable memory 240, a transmitter 250, and a GPS device 260, an integrated or removable universal subscriber identifier module (USIM) module 270, a trusted platform module (TPM) 280 which is a secure hardware component that provides a secure storage and execution environment, and a network card 290 comprising a modem (baseband) processor. In alternative embodiments, the USIM module 270 may be implemented as an integrated or removable universal integrated circuit card (UICC), or as an embedded functionality implemented collectively by the processor 220, the TPM 280, and some of the internal memory 230. In an alternative embodiment, the network card 290 may be integrated into the processor 220. The processor 220, among other things, is configured to process into the processor 220. The processor 220, among other things, is configured to process one or more applications. In an alternative embodiment, the application processor may be a separate device.

In one embodiment, a H(e)NB has parameters that are configured by an operator (carrier, wireless provider, etc.) using conventional methods and parameters that may be configured by a subscriber (based upon proper authorization and/or authentication). The operator can configure parameters that control, restrict, and define the operation of the H(e)NB including, but not limited to a public land mobile network identifier (PLMN ID) that should be broadcasted by the H(e)NB, H(e)NB supported services (basic voice service, emergency call support, high speed data support), security parameters used by the H(e)NB (such as whether it is locked, whether user data is protected, the security keys and algorithms used for performing these functions), the spectrum in which the H(e)NB operates, the location of operation, and/or the tariffs employed. Some of these parameters are only configurable by the operator. Such parameters are referred to as locked parameters, thus a H(e)NB can be locked in a manner similar to the way WTRUs (mobile phones, etc.) are locked by an operator. Referring to FIG. 2, these parameters are handled by the processor 220 and may be stored in the memory 230. The TPM 280 may be used to securely store the parameters either within its own internal non volatile random access memory (NVRAM), or store encryption keys that have been used to encrypt these parameters, which are then stored encrypted in memory 230.

In FIG. 2, the USIM module 270 may store the static configuration parameters and assist the H(e)NB in its self-configuration upon start-up. Additional parameters can also be included in a standard H(e)NB configuration independent of the specific services (LTE, GERAN, 3GPP, etc.) offered by the H(e)NB. Alternatively, some of the parameters may be stored either within the TPM 280 or in the memory 230 but encrypted by keys stored in the TPM 280.

H(e)NB parameters may be configured or modified using a locking (lock/unlock) function. The locking function manages access to H(e)NB parameters and comprises commands such as lock and unlock, and other procedures such as authentication, verification and similar capabilities. In one embodiment, this function, is included in a smart card or a removable memory module, and could be extended to serve both a WTRU and the H(e)NB, that is, a single smart card could provide this function for both a WTRU and an H(e)NB.

In another embodiment, the locking function ensures that the H(e)NB cannot be operated unless specific criteria for operation are met (specific parameters must be set in a specific manner or contain specific values). The locking function is enforced at the hardware level or by using trusted computing techniques that provide a secure execution environment and a secure storage environment. Lockable parameters include but are not limited to the public land mobile network identifier (PLMN ID) that is broadcasted by the H(e)NB, H(e)NB supported services, security parameters used by the H(e)NB, the spectrum (frequency) in which the H(e)NB operates, the location of operation, and/or the tariffs employed.

In the event that a user attempts to reconfigure parameters of operation without the requisite authority the locking function will take one or more actions including, but not limited to forcing the H(e)NB to stop operating or shutting it down, reducing the offered services, restricting admission control, resetting configuration parameters by sending operational and maintenance (O&M) signaling or control plane (C-plane) signaling to the operator, sending warning messages to the operator, and/or directly contacting the operator.

As stated above, the H(e)NB may be configured such that only the original operator or vendor is able to change certain parameters (the H(e)NB is locked). In another embodiment, the operator specifies in the locking function that the H(e)NB is allowed to accept a WTRU only if it is subscribed with that operator. This may be indicated, for example, by the PLMN ID in messages sent by the WTRU. Thus, if the user changes operators, the user will not be able to use the H(e)NB until and unless the H(e)NB is unlocked and this parameter is changed.

In another embodiment, Open Mobile Alliance (OMA) mechanisms, such as client provisioning and device management (DM), are applied between the operator network and the H(e)NB. When the H(e)NB is configured and setup, there is an exchange of information between the network and the H(e)NB using OMA mechanisms so that specific capabilities are configured in the H(e)NB. In FIG. 2, such OMA procedures may be performed by the processor 220.

In one embodiment, the "unlock" capability of the locking function (enforced, for example, at the hardware level or using trusted computing techniques) ensures that the H(e)NB can be "unlocked" when all requisite (predetermined) criteria for operation are met. Examples of such conditions include:

successful authentication of the H(e)NB and/or the (new) owner of the H(e)NB, and/or successful verification of the context of the request for "unlocking" of the H(e)NB by its owner/operator, and/or successful verification of the attestation by the H(e)NB of its platform trustworthiness.

Attestion means an attempt by the H(e)NB to 'attest to the trustworthiness of the platform of the H(e)NB to an appropriate network entity'. Verification means that entity's verification of such attestation from the H(e)NB. Referring to FIG. 2, the parameters needed to "unlock" the H(e)NB may be stored in the USIM module 270. Alternatively, it may be stored within the TPM 280 or in the memory 230 but encrypted by keys stored in the TPM 280.

The "unlock" command and the parameters to be modified are forwarded from the Core Network/ radio network controller (RNC) to the H(e)NB via signaling such as new O&M signaling or C-plane signaling. In another embodiment, such commands and parameters are forwarded by the use of OMA DM.

An H(e)NB may be moved from one location to another. An H(e)NB has the capability to detect such location changes via a variety of mechanisms. Referring to FIG. 2, such location change detection functionality may be implemented collectively by the processor 220 and the global positioning system (GPS) (or assisted GPS (A-GPS) or any other positioning device) 260. The USIM module 270 may securely store parameters and configuration files for the location change detection functionality. Alternatively, the TPM 280 may be used to either directly store such parameters and configuration files within it, or to store encryption keys that have been used to encrypt such parameters and files. The TPM 280 may also be used to protect the integrity of the software handling the location change detection functionality.

In one embodiment, the H(e)NB is programmed with the identifier or identifiers (ID)s of any surrounding macro-cell(s), such as LTE, GSM/edge radio network (GERAN) and the like and/or neighbor cells. The H(e)NB is programmed to detect neighbor cells and certain expected measurement values. Upon startup, if the H(e)NB detects one or more pre-programmed cells and determines that the radio strength of one or more of these cells is within or close to expected measurement values, the H(e)NB assumes that its location has not changed significantly (for example, within the surrounding macro-cell). In another embodiment, the H(e)NB uses the location information provided by its onboard GPS, or from a WTRU that it is serving, or from a WTRU in a neighboring cell, and compares this information with its configured (stored) location parameter or parameters to determine if its location has changed. Referring to FIG. 2, either the USIM module 270 or the TPM 270 (either directly or indirectly by storing encryption keys) may store the IDs of the macro-cell, the list of detected neighbor cells and other expected and real measurement values, and any location information or the WTRU-reported neighbor cell information. The processor 220 may perform any algorithms for the location change detection.

Alternatively, if the H(e)NB is unable to detect a pre-programmed cell, and/or the radio strength of any surrounding cell is significantly lower than the expected value, the H(e)NB will assume that either its neighbors have changed (assuming that the H(e)NB can determine that it has not moved), or that its location has changed. In the event that the H(e)NB is absolutely certain that it has not moved (all stored expected location parameters match all provided or measured location information and parameters), the detection of a change in a neighbor cell will trigger a request to the core network (CN) (using, for example, O&M signaling), to update its neighbor list. Referring to FIG. 2, the signal measurement obtained from the receiver 210 may be processed by the processor 220, and a determination may be made by the processor 220 on whether the radio strength from any surrounding cell is significantly lower than the expected value. If such a determination is made, a notification of a detection of the change in a neighbor cell may be transmitted to the CN by the transmitter 250.

Alternatively, if the H(e)NB determines that its location might have changed (some stored expected location parameters match only some provided or measured location information and parameters) it will, depending on its connectivity and programmed configurations, implement by way of the processor 220, the transmitter 250, the USIM module 270, and the TPM 280, any of the following location update mechanisms (procedures) either individually or in any combination:

contact the operator core network and report a change in location with an indication of the new location/new IP address, and any detected neighbors;

request updated neighbor list information;

institute a trigger locking mechanism;

broadcast an out of service alert message to the WTRUs attempting to connect to the H(e)NB;

continue operating or reconfigure its neighbor list on its own.

In one embodiment, the H(e)NB has a periodic timer, which, when it expires, causes the H(e)NB to contact the operator network and request an updated neighbor list. Referring to FIG. 2, such a timer may be implemented by the TPM 280 or the processor 220 or collectively between them. The operator network will then give the H(e)NB an updated neighbor list based on any updated information it has and the H(e)NB will use this to understand the extent of change in its surroundings.

In another embodiment, the H(e)NB may include a position detection device, for example, a GPS chip(referred to as GPS 260 in FIG. 2), that may provide the absolute location of the H(e)NB. Limited mobility of the H(e)NB preferably is supported. Consequently, the H(e)NB will have a range of coordinates within which it is able to operate. This range may include, multiple locations, examples of these locations include but are not limited to a home, an office, an alternative office, retail building, a commercial space, areas adjacent to homes, offices, retail buildings, commercial spaces etc.

In another mobility management embodiment, the H(e)NB defines an association between the H(e)NB and a serving Higher Network Node (HNN), which could be an RNC or the base station (BS) ID of a macro-cell. Each HNN advertises its own identity and the H(e)NB listens to the identity of the serving HNN and stores it internally. When the H(e)NB moves to a new location which is served by a different HNN, the H(e)NB detects this change by comparing the advertised HNN identity and its own stored value. If they differ, a H(e)NB location update procedure is initiated. Referring to FIG. 2, the processor 220, possibly with assistance from the GPS module 260, the USIM module 270 and/or the TPM 280, or any combination of these, may perform functionality to determine the absolute location of the H(e)NB or the relative location (in the form of neighbor-cell lists and HNN lists) and perform functions such as access-control and out-of-range reporting.

In another embodiment, the H(e)NB is programmed with a data base (H(e)NB DB) including, but not limited to WTRU information such as WTRU ID(s), expected values for certain WTRU parameters (power capability of the WTRU, support for Multiple Input Multiple Output (MIMO), modulation capability of WTRU, security algorithms supported by WTRU) and other similar characteristics of the WTRUs (for example: validation, authentication, etc.) in order to be connected or to request connection to the H(e)NB. Any element of the H(e)NB DB shall be considered H(e)NB DB "information" or "data." Referring to FIG. 2, the processor 220, in conjunction with the memory 230, may handle such a database. Alternatively, the TPM 280 may also additionally be used to store some or all of the elements of the database in a secure manner.

Alternatively, the H(e)NB may acquire this information over time (a typical range is 0 to 5 minutes) from the WTRUs connecting to it. In a home setting and over some reasonably long periods of time (a typical range is 0 to 5 minutes), many if not most of the WTRUs connected to a given H(e)NB would be the same. Therefore, upon startup and after monitoring the WTRUs connected to it for a specified period of time, if the H(e)NB detects that a large amount of the WTRU IDs have changed, or that other WTRU characteristics vary from the expected values in the H(e)NB DB, the H(e)NB may assume that its location has changed.

If the H(e)NB suspects such a change, then the H(e)NB may assume that either there is a change in the IDs and other characteristics of the WTRUs that are connecting or requesting to connect to it, or that its location has changed. In the event that the H(e)NB is absolutely certain (e.g. using GPS, neighbor cell information provided by a WTRU) that it has not moved, such a detection of change in H(e)NB DB information is, for example, communicated to the Core Network/RNC (e.g. using O&M signaling) by either sending an alert message indicating such change( or suspicion of change), or requesting verification that the perceived changes in the IDs or other characteristics of the WTRUs connected (or requested to connect) to the H(e)NB are valid. Referring to FIG. 2, the processor 220 would perform the functions of determining the change in the ID and other characteristics, and then the transmitter 250 would wirelessly send the notification message to the network.

The H(e)NB can perform a secure and trusted method to determine its own location with certainty. Such methods comprise the use of location detection methods such as GPS or assisted GPS (A-GPS), for instance, where the GPS/A-GPS devices, the interface from the GPS device to the H(e)NB's processor, and the programs and data associated with the H(e)NB's processor in regard to the location processing, are secured and made trustworthy.

The H(e)NB may have a tamper detection circuit which is capable of detecting physical tampering of the H(e)NB. In the event that the H(e)NB detects tampering, it may send an alert message indicating such tamper detection (or suspicion of tampering) to the carrier, owner and/or core network.

In another embodiment, if the H(e)NB determines a possible change in its location, depending on its connectivity and programmed configurations, it can implement by way of the processor 220 in conjunction with possible assistance from the memory 230, the transmitter 250, the USIM module 270, and TPM 280, as illustrated in FIG. 2, any of the mechanisms listed below either individually or in any combination or implement other possible schemes as one skilled in the art will recognize:

1) contact the Operator Core Network/RNC and report the change in location (with an indication of new location/IP address etc.), detected changes of WTRU ID's or changes in other characteristics of the WTRUs in the H(e)NB cell, and/or request that the Core Network/RNC send an update for the database of expected WTRUs, respective IDs and characteristics;

2) trigger a locking mechanism;

3) broadcast an out of service alert message to the WTRUs attempting to connect to the H(e)NB; and 4) continue to operate and/or reconfigure its list of expected WTRU ID's and other WTRU characteristics (e.g. power capability of the WTRU, support for MIMO, modulation capability of WTRU, security algorithms supported by WTRU).

In another embodiment, the H(e)NB 200 includes a periodic timer which upon expiration causes the H(e)NB 200 to contact the Operator network. The Operator network then provides updated information for the H(e)NB DB. The H(e)NB can also contain a position detection device (GPS, etc.) that provides it with its the absolute location. The H(e)NB can be moved within a certain range of coordinates (say between different rooms or offices) without triggering an update to the H(e)NB DB.

If a major change in location (outside the range of allowed coordinates) is indicated by the position detection device, the H(e)NB, depending on its connectivity and programmed configurations, will implement the following mechanisms either individually or in any combination:

contact the operator core network and report its change in location with an indication of a new location, a new IP address and new detected neighbors. The H(e)NB may request updated neighbor list information;

trigger a locking mechanism;

broadcast an out of service alert message to the WTRUs attempting to connect to the H(e)NB; and continue operating and/or reconfigure its location.

In another embodiment, an H(e)NB uses the location information, provided by a WTRU that it is serving, to determine whether its location has changed.

Alternatively, the H(e)NB detects a change in its location based on the IP address assigned to it (for example, if an IP address is assigned using dynamic host configuration protocol (DHCP) and is different from the one assigned earlier, or if any of the IP addresses of the network router to which the H(e)NB connects changes). A detection based on these parameters will cause the H(e)NB to, depending on its connectivity and programmed configurations, implement by way of the processor 220 and the transmitter 250, with possible assistance from the USIM module 270 and the TPM 280, any of the following location update procedures, either individually or in any combination:

contact the operator core network and report a change in location with an indication of a new location, a new IP address and new detected neighbors. The H(e)NB may request updated neighbor list information;

trigger a locking mechanism;

broadcast an out of service alert message to the WTRUs attempting to connect to the H(e)NB; and continue operating and/or reconfigure its location.

In another embodiment, when the H(e)NB detects a change in its IP connectivity, it will implement a mobility mechanism such as Internet Engineering Task Force (IETF) compliant Client Mobile IP or Proxy Mobile IP, in the H(e)NB. This enables the H(e)NB to report its location change to the operator core network via a public IP network. The mobility mechanism may be enhanced by including an additional indication of the new absolute location by using, for example, a GPS chip or location information obtained from the WTRUs connecting to the H(e)NB.

In a conventional wireless communications system, a Node-B (NB) or an evolved Node-B ((e)NB) is programmed (for example, by O&M procedures, etc.) with a neighboring cell list (NCL). This technique works because the NCL does not change very often and conventional NBs and (e)NBs do not change location. In comparison, an H(e)NB may frequently change location, but at the same time must flexibly continue operation without requiring operator intervention.

A WTRU may detect information about the cells to which it can connect. Additionally, a given WTRU may be able to connect to cells not in the NCL of a NB or (e)NB to which it is connected. However, while such additional cell connection information may be detected by the WTRU, the WTRU is typically directed by a NB or (e)NB to only collect measurement information from cells that are listed in that NB's or (e)NB's respective NCL and transmit this measurement information to the respective NB or (e)NB.

In contrast, the H(e)NB can use this detected cell information to dynamically create its neighboring cell list, the H(e)NB NCL. In one embodiment, the H(e)NB sends messages to its WTRUs requesting that each WTRU send information about the cells to which it can connect (detected cell information). The WTRU sends this information to the H(e)NB in its measurement report. This detected cell information may be part of an existing measurement report using existing messages and data structures, or a new message, new data structure or information element may be used to store and transmit this detected cell information. The H(e)NB receives the detected cell information from each WTRU, processes the detected cell information and uses the detected cell information to generate its NCL.

In another embodiment, the H(e)NB is able to detect the type and characteristics of the physical layer connection to the operator core network/RNC, for example, digital subscriber line (DSL), cable modem, T1 connection or wireless, and report (indicate) this to the operator. In addition, the H(e)NB may choose to change some of its parameters. For example, in one embodiment, the H(e)NB offers multiple types (e.g.: graded) and levels of service based on the type and or characteristics of its connectivity methods to the core network/RNC. The H(e)NB may change any one or more of such characteristics including but not limited to: services offered, admission control parameters, and number of users supported, based on the capabilities of the underlying physical layer connection. The H(e)NB may also change additional characteristics that include, but are not limited to data rate, guaranteed throughput, maximum throughput, bit error rate, quality of service, air interface signaling, and other similar capabilities. In addition, the operator may change, via the core network, H(e)NB parameters such as services and security, depending on the type of connectivity available to the H(e)NB. Referring to FIG. 2, the processor 220, with assistance from the receiver 210, and possibly also from the USIM module 270, and the TPM 280, may determine the type of the connectivity of the WTRU 200 and coordinate any response actions thereof.

As mentioned above, certain parameters of the H(e)NB are user configurable, independent of O&M, C-plane or operator signaling. This is unlike e-NB re-configuration, which is operator controlled only. In one example embodiment, a user is be able to change the power level at which the H(e)NB operates to give it greater coverage. The H(e)NB preferably is pre-configured with a maximum power limit. A user can configure the power level, up to the specified limit, independent of the operator. Preferably, the H(e)NB implements a mechanism that allows a user to change other parameters, such as services offered to non-subscribed pedestrians. To enable this type of reconfiguration, the H(e)NB implements a mechanism that offers the user a suitable interface over an IP network with facilities similar to those provided by a WLAN AP. Referring to FIG. 2, the processor 220, in conjunction with the USIM module 270 and/or the TPM 280, may perform coordination of the user-initiated reconfiguration of the H(e)NB parameters.

In another embodiment, the H(e)NB can vary parameters such as modulation technology, rate, and power level transmitted such that they are all within defined thresholds depending on the number of transmission errors it encounters and the transmission rate.

Alternatively, a power control mechanism can be applied to an H(e)NB along with adaptive modulation and coding (AMC). This will assist the H(e)NB in maintaining the required QoS to a WTRU.

In one embodiment, additional procedures are defined which simplify H(e)NB actions or services. For example, filtering measurements at L1 are simplified by using linear filtering instead of logarithmic filtering (considering the limited range and environment in which the H(e)NB operates), features like fractional dedicated physical channel (F-DPCH) in release 6 3GPP are made optional by use of special IEs in the H(e)NB. Additionally, the front end radio frequency (RF) are made simpler by not using transmitter (Tx) diversity. Such simplification is possible because the H(e)NB operates in a less complex environment than an eNodeB. Essentially an H(e)NB operates as a very simple and basic cellular base station offering only those services that are required. Referring to FIG. 2, such new Information Elements (IE's) may be created and/or handled by the processor 220 and the memory 230, possibly with assistance from the USIM module 270 and even the TPM 280.

In another embodiment, H(e)NB functionality and credentials are remotely setup and modified under the control of the Operator Core Network by way of O&M/C-plane/operator signaling. Such functionality may be very beneficial to reducing the cost of H(e)NBs and also to 'reuse' H(e)NB hardware by remotely re-provisioning or migrating the functions. Examples of such remotely configurable functionality and credentials includes functionality for the following: cellular communication, communication with the Operator Core Network/RNC, secure management of the H(e)NB's ID and other credentials, management of downloadable USIM credentials and executables, management of downloadable security policies and configuration parameters, management of neighbor cells and/or 'expected' UEs, or attestation of the trustworthiness of the H(e)NB, and any credentials that are required to support such functionality listed above. Additionally, this capability enables the functionality of the H(e)NB to be enhanced in the future with capabilities such as a relay capability for cooperative communications, assisting the Operator to reach target UEs through enhancements of the H(e)NB, use of multiple air interfaces such as GS/GPRS/ Edge, WCDMA HSPA, WLAN, WiMAX etc. based upon various QoS metrics measured and gathered by the H(e)NB.

Referring to FIG. 2, the processor 220 would perform the coordinating role in the provisioning of the parameters or executables.

Techniques similar to those defined by the Trusted Computer Group (TCG) such as the use of Trusted Computer Platform (TPM) and/or Mobile Trust Module (MTM) and related commands may be used to allow H(e)NB functionality and credentials to be remotely managed (provision-able or migrate-able). In one embodiment, these methods and techniques allow remote attestation of the integrity of the H(e)NB platform to the Operator or other authorized challengers, secure and migrate-able (under secure authorization) storage and management of credentials and cryptographic keys, and secure encryption/decryption capability. In another embodiment, each H(e)NB is equipped with a TPM or an MTM, and these secure embedded devices enable the H(e)NB to provide secure remote provisioning and the migration of functions and credentials. Referring to FIG. 2, the TPM (or a Mobile Trusted Module (MTM)) 280 may perform such integrity-attestation functionality.

The functions set forth above preferably require specific messages between the H(e)NB and the operator core network/RNC. In one embodiment, this information is sent in dedicated messages, as part of other existing messages or as Information Elements (IEs) and may be a part of O&M signaling or may be a part of standard S1-mobile management entity(MME)/S1-user plane entity(UPE)/X2 type signaling or any other type of new signaling.

Such messages, by way of example, include:

"location update". This indicates such information as a change in location of an H(e)NB to the core network, an anticipated change, access restrictions associated with that location, service parameters, security parameters and commands from the core network;

"WTRU List." This indicates a list of the WTRU IDs and other characteristics of WTRUs that are connected or requesting to connect to the H(e)NB.

"type of connectivity". This indicates the type of connectivity, for example, DSL or cable, that the H(e)NB has with the operator along with other characteristics of the connection, such as quality of service (QoS) support;

"reconfigured parameters". User configurable parameters include: services offered by the H(e)NB, some specific radio resource control (RRC) parameters such as values for power control, and the like. Such user reconfiguration may be performed independent of the operator. The H(e)NB could indicate these reconfigured parameters to the operator core network/controlling entity/RNC in a new IE or message that contains the user-configurable parameters;

"handover and reselection parameters". This includes parameters for handover and reselection from an H(e)NB to a macro-cell. Other H(e)NBs could also be signaled in the H(e)NB; and "H(e)NB platform and functionality attestation." This includes new parameters and information for secure remote attestation of the H(e)NB's platform and/or functionality authenticity and integrity to the Operator Core Network or other authorized challengers.

Referring to FIG. 2, these messages may be handled by the processor 220, in conjunction with the memory 230, USIM module 270, and TPM 280, and any response messages to the network may be transmitted by the transmitter 250.

In another embodiment the location of an H(e)NB may be defined in terms of its neighboring HNNs or by the associated HNN. H(e)NB mobility management is facilitated by maintaining a database of the location of each H(e)NB. For this purpose, functional entities similar to home location register (HLR) and visiting location register (VLR) are created in the network. In one embodiment, each HNN contains a database of all served H(e)NBs (similar to VLR functionality). In another embodiment the database could be placed in the Core Network, for example the Mobile Switching Center (MSC) or Serving GPRS Support Node (SGSN).

Figure 1:
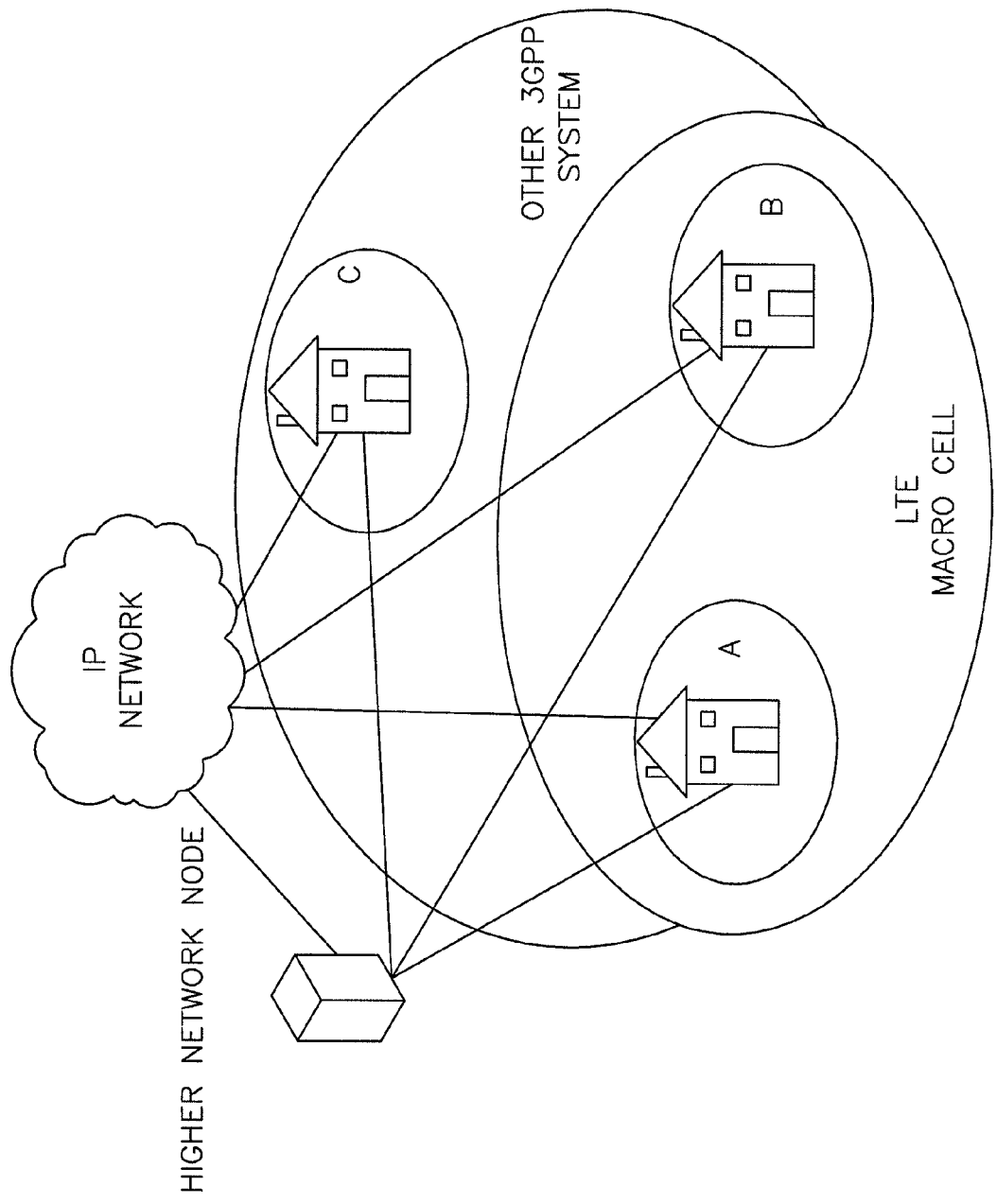
FIG. 1 shows an example of a H(e)NB deployment.
Figure 3:
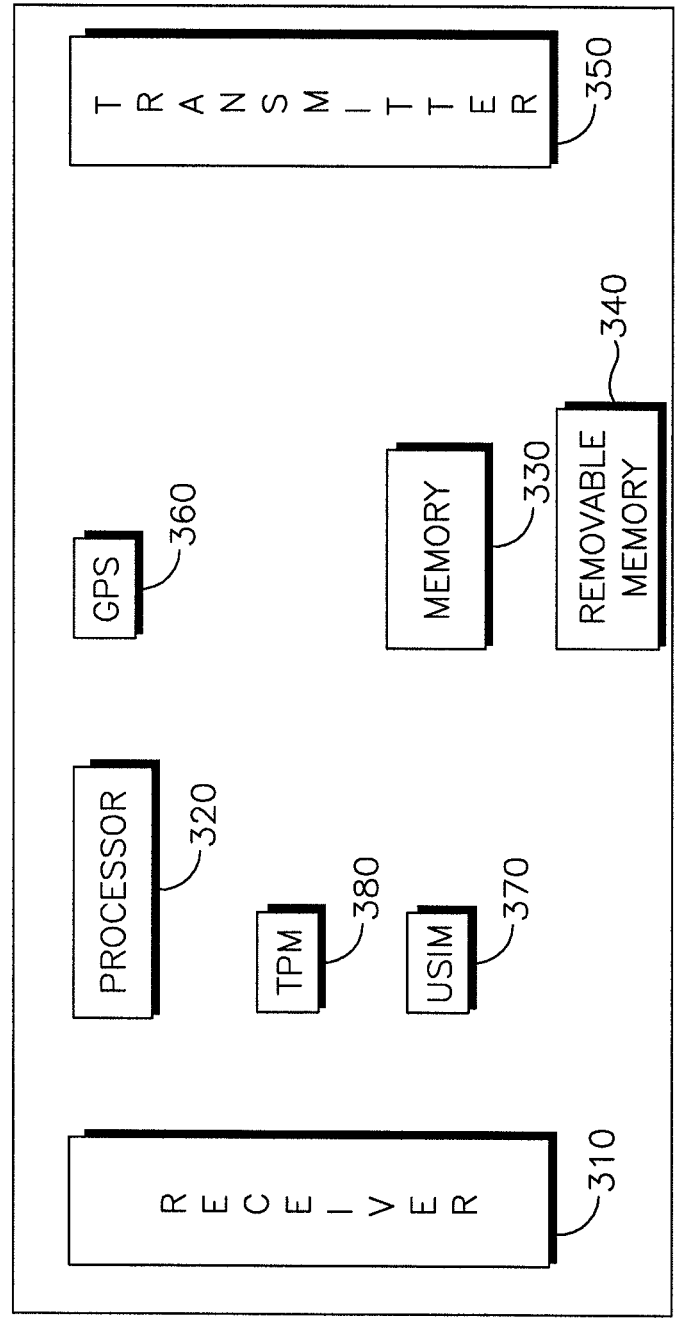
FIG. 3 shows an embodiment of a relay station (RS) H(e)NB and its respective components.
Figure 4:
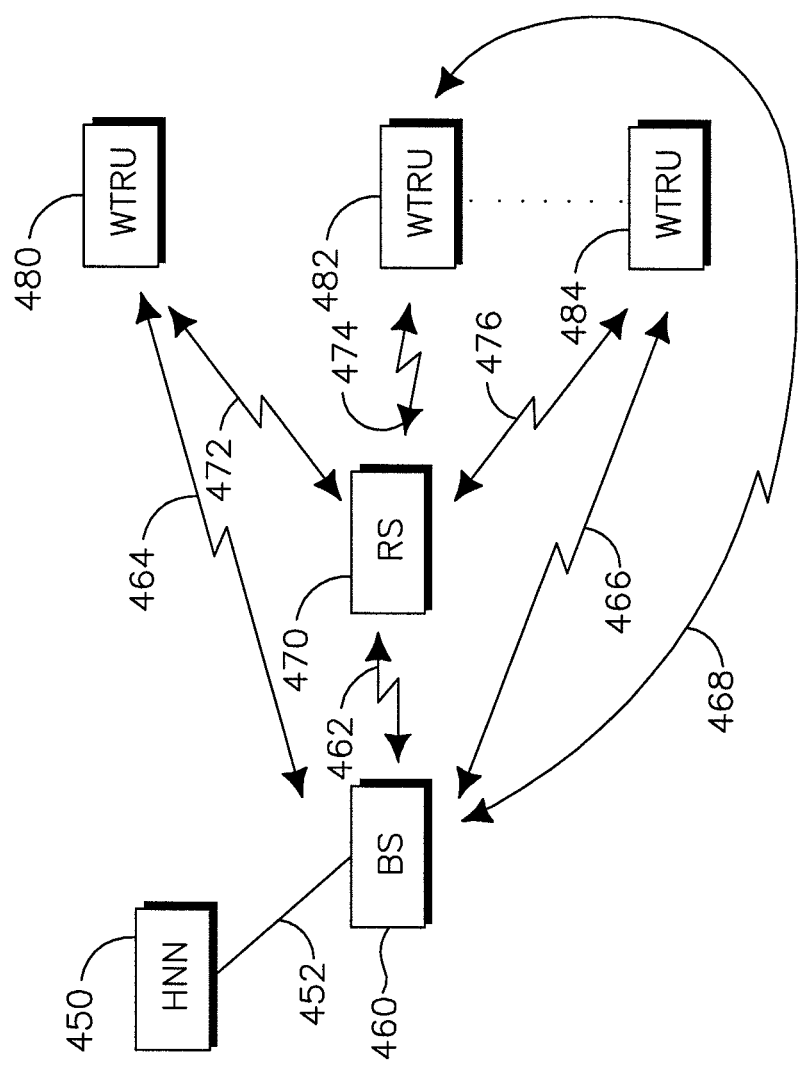
FIG. 4 shows an example of a RS deployment.

In one embodiment, an example RS deployment is illustrated in FIG. 4, a Relay Station (RS) 470 is a special kind of H(e)NB. A RS 470 is typically considered to act as a "helper node" to facilitate and improve the communications between a BS 460 (which plays the role of HNN in FIG. 1) and one or more WTRUs (480, 482, 484). The RS 470 is similar to a typical H(e)NB in that it provides local coverage in a macrocell served by a HNN. Similarly, a RS 470 is typically a physically small and inexpensive node that can be easily installed and configured. Precisely due to these reasons, a RS 470 may exhibit a mode of mobility similar to that of a typical H(e)NB. Therefore, some of the mobility management solutions for the typical H(e)NB are directly applicable and/or extensible to the RSs. An example of the internal components of an RS 300 is illustrated in FIG. 3. The RS 300 contains a Processor 320, a trusted platform module 380, a USIM 370, a GPS 360, a memory 330, a removable memory (e.g. a smart card) 340, a transmitter 310 and a receiver 350.

In one embodiment, a RS 470 communicates with one or more HNNs (e.g. BS 460) via a wireless link 462 which may use the same spectrum and signaling schemes as that used for communications by a WTRU 480 as shown in FIG. 4. In FIG. 4, the WTRUs 480, 482, 484 are connected to the RS 470 via respective wireless links 472, 474 and 476. The WTRUs are also able to communicate wirelessly with the BS 460 via links 464, 466, and 468. The BS 460 may be connected to a HNN 450 via link 452 which could be wireless or hard-wired. The RS 470 registers itself through a registration procedure, which includes the verification of credentials via mutual (two-way) or unilateral (one-way) authentication. The registration data is stored in a database in the network. The database resides in the HNN 450 or another node in the network such as in the home subscriber server (HSS) in a 3GPP network which also contains HLR and VLR databases. In another embodiment, this data resides in a core network element, such as an SGSN or Gateway GPRS Support Node (GGSN). In non-3GPP networks, similar nodes are identified for storing the registration data.

The registration process is performed either at the time of installation and periodically at regular intervals of time (for example once a day), or as a response to a request by the network, or other similar conditions. As part of the registration process, a candidate RS may be denied registration, for example, if the authentication fails. Similarly, an RS may decide not to register with a particular HNN based on several criteria, which may include but are not limited to authentication, restrictions imposed by the HNN on the operation of the RS, and any economic factors relating to the usage of the HNN.

Following the registration process, is the process of Attachment. This process is dynamic process that executes frequently, involves the current state of an RS and the HNNs that it is poised to communicate with. Procedures similar to GPRS attach/detach may be employed here. For example, as described in 3GPP TS 24.008-780, Section 4.7.3, the RS sends an ATTACH REQUEST MESSAGE, which contains a number of RS attributes, such as RS Identity, Radio Access Capabilities, Ciphering details, etc. The RS Identity may be permanent or temporary. The Radio Access Capabilities may include RF Power Class, Multiple Antenna capabilities, Interference Cancellation capabilities, Handover capabilities as well as support for other radio technologies supported (e.g. UMTS FDD, LTE, CDMA2000 etc) [See 3GPP TS 24.008-780, Section 10.5.5.12a]. The BS examines the ATTACH REQUEST message and if acceptable and deemed useful for cooperative purposes, will transmit an ATTCH ACCEPT message.

An RS may attach with one or more HNNs. When it is attached to multiple HNNs, diversity techniques may be used for improved communications within a multi cell system.

The data that describes the location of an RS may take a form similar to the data that describes H(e)NB location. This data includes but is not limited to identity of the HNN to which the RS is attached; identities of the HNNs to which the RS is attached; identities of HNNs which are in the radio reception range of the RS (even though the RS is not attached to any or all of them); and identities of other RSs which are in the radio vicinity of the RS under consideration.

When a RS changes its state of registration or attachment, a number of procedures may be invoked. For example, if a RS is moved from its present location, this may trigger a new registration/attachment procedure at the new location. Similar to the concept of Home Network and Visited Network in Cellular Systems for WTRUs, RSs may also have a Home Network. Thus, when a RS moves to a network that is not its Home Network, i.e. a Visited Network, then the registration/attachment procedure in the Visited Network may involve a communication between the Visited and Home Networks for the purpose of authenticating the RS. RS roaming procedures similar to WTRU roaming procedures in current cellular systems may be used.

In another embodiment, a RS experiences a failure and ultimately stops working (complete failure). In such a case, prior to complete failure, the RS may communicate with the HNN and possibly other nodes in the core network and inform them of the change of status. This will trigger a de-attachment procedure. In another embodiment, the RS may be solar-powered (full or partial). The RS may wish to conserve power by shutting itself down. In another embodiment, the RS may be battery or solar-powered (full or partial). This is a particularly attractive way to power a RS because RSs are small, expected to be deployed in large numbers and operate unattended. Alternatively, the RS may wish to conserve power by using Idle (or Sleep) mode procedures similar to those performed by a WRTU connected to a BS. When the RS is in Idle mode, power utilization is minimized. In such a case, prior to transitioning to Idle mode, the RS may send a message to notify the BS indicating such a transition.

An RS, which is unattached and possibly unregistered in a particular location with any HNN, advertises itself, seeking to know if any HNN requires its services. Specifically, the RS listens to the radio beacon signals and determines the presence of HNNs. Depending on the results, it selects suitable radios (assuming a RS is capable of multiple radio modes, such as GSM, WCDMA, WLAN etc) and sends advertisement messages. If the RS is a single mode device (a special case), it will skip searching for the radios and immediately advertise itself. Since HNNs know the nature of their radio coverage and coverage holes, etc., they are in a position to determine whether or not they need relay help. Therefore, using such criteria, the BS may choose to use the help of an advertised RS and negotiate terms of a contract. The contract may involve duration of assistance, nature of assistance, modes of assistance, etc. Subsequently, the RS 'sells' its services which includes registering and attaching with the HNN and upon the completion of the contract, de-registers and de-attaches itself with the HNN. This solution provides for a deployment scenario where a number of 3rd party radio helper RSs are possible. It may also encourage a type of tier-2 radio coverage providers and a secondary market.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital video disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed:

1. An in-home Node-B (H(e)NB) comprising:
   a processor configured to:
   initiate a platform validation of the integrity of the H(e)NB, the platform validation of the integrity of the H(e)NB being at least one of successful or unsuccessful, the platform validation procedure including sending an attestation of the platform's trustworthiness to a network entity upon the platform validation procedure being successful;
   detect a change in location by comparing at least one of a surrounding macro-cell identifier and a first corresponding radio strength or a neighbor cell identifier and a second corresponding radio strength, with at least one of an expected macro-cell identifier and a first expected corresponding radio strength or an expected neighbor cell identifier and a second expected corresponding radio strength;
   receive and maintain trust related credentials via a remote provisioning upon the platform validation procedure being successful, the trust related credentials enabling the adjustment of one or more secure parameters of a configuration of the H(e)NB, the condition that the platform validation procedure is successful including determining a location of the HeNB is substantially similar to a location that was determined during a previous platform validation procedure; and
   trigger a locking function upon the platform procedure being unsuccessful, the condition that the platform validation procedure is not successful including determining a location of the HeNB is different from a location that was determined during a previous platform validation procedure.

2. The H(e)NB of claim 1, wherein the processor is a trusted processing module.

3. The H(e)NB of claim 1, wherein the processor includes a secure execution environment.

4. The H(e)NB of claim 3, wherein the locking function is enforced at a hardware level or by using the secure execution environment.

5. The H(e)NB of claim 1, wherein the processor is further configured such that the condition that the platform validation procedure is successful further includes a verification successful message being received in response to the attestation.

6. The H(e)NB of claim 1, wherein the processor is further configured such that the determining the location of the H(e)NB includes verifying a current neighbor list.

7. The H(e)NB of claim 1, wherein the processor is further configured such that the determining the location of the H(e)NB includes using an Internet Protocol (IP) address.

8. The H(e)NB of claim 1, wherein the locking function upon a user attempt to reconfigure H(e)NB parameters without authority performs at least one of stopping, shutting down, reducing the offered services, restricting admission control, resetting configuration parameters by sending operational and maintenance (O&M) signaling or control plane (C-plane) signaling to an operator, sending warning messages to the operator, or directly contacting the operator.

9. The H(e)NB of claim 1, wherein the locking function allows wireless transmit/receive units (WTRUs) to connect to the H(e)NB only if the WTRUs are subscribed with the H(e)NB carrier.

10. The H(e)NB of claim 1, wherein the locking function ensures that the H(e)NB can be unlocked when predetermined criteria for operation are met.

11. The H(e)NB of claim 10, wherein the predetermined criteria includes:
    successful validation of the H(e)NB; and
    successful verification of an attestation by the H(e)NB of its platform validation.

12. The H(e)NB of claim 1, wherein a locking function unlock command or locking command are received from a core network or a radio network controller via signaling.

13. The H(e)NB of claim 1, wherein a locking function command, along with modified parameters are received via Open Mobile Alliance (OMA) Device Management (DM) mechanisms.

14. The H(e)NB of claim 1, wherein the H(e)NB detects a change in its location by comparing at least one of a surrounding macro-cell identifier and neighbor cell identifier along with a corresponding radio strength, with at least one of an expected macro-cell identifier parameter and an expected neighbor cell identifier, and an expected corresponding radio strength.

15. The H(e)NB of claim 1, wherein the H(e)NB detects a change in its location by comparing a stored location parameter with at least one of a served wireless transmit/receive unit (WTRU) location, or a neighboring cell WTRU location.

16. The H(e)NB of claim 1, wherein the H(e)NB transmits a request to update a neighbor list if a neighboring cell has changed and the H(e)NB location has not changed.

17. The H(e)NB of claim 1, wherein the H(e)NB may operated within a range of locations including:
   a home;
   an office;
   an alternative office;
   a retail building; and
   an area adjacent to a home, office or retail building.

18. The H(e)NB of claim 1, wherein the H(e)NB initiates a location update procedure if a stored serving higher network node (HNN) identity is different from an advertised serving higher network node (HNN) identity.

19. The H(e)NB of claim 1, wherein the H(e)NB detects a change in its location by comparing a first assigned Internet Protocol (IP) address with a second assigned IP address.

20. The H(e)NB of claim 19, wherein if the H(e)NB detects a change in its location, the H(e)NB performs at least one of the following:
   contact the operator core network and report a change in location with an indication of a new location, a new IP address and new detected neighbors;
   request updated neighbor list information;
   broadcast an out of service alert message to a wireless transmit/receive unit (WTRU) attempting to connect to the H(e)NB;
   continue operating and/or reconfigure its location; and
   implement an Internet Engineering Task Force (IETF) mobility mechanism that enables the H(e)NB to report its location change via a public IP network.

21. The H(e)NB of claim 1, wherein the H(e)NB detects the type and characteristics of physical layer connection to the operator core network (CN) or radio network controller (RNC) wherein the physical layer comprises at least one of Wideband Code Division Multiple Access (WCDMA) High Speed Packet Access (HSPA), Global System for Mobile Communication (GSM) Edge Radio Access Network (GERAN), Wireless Local Area Network (WLAN), Digital Subscriber Line (DSL), cable and Worldwide Interoperability for Microwave Access (WiMAX), based upon quality of service (QoS) metrics measured and gathered by the H(e)NB and using QoS parameters stored in the H(e)NB DB.

22. The H(e)NB of claim 21, wherein the H(e)NB changes at least one of services offered, admission control parameters, and number of users supported, based on the capabilities of the underlying physical layer connection.

23. The H(e)NB of claim 21, wherein the H(e)NB changes at least one of data rate, guaranteed throughput, maximum throughput, bit error rate, air interface signaling, and quality of service.

24. The H(e)NB of claim 1, wherein the processor is further configured to provide procedures to simplify H(e)NB actions or services.

25. A method for configuring a H(e)NB comprising:
   initiating a platform validation of the integrity of the H(e)NB, the platform validation of the integrity of the H(e)NB being at least one of successful or unsuccessful, the platform validation procedure including sending an attestation of the platform's trustworthiness to a network entity upon the platform validation procedure being successful;
   detecting a change in location by comparing at least one of a surrounding macro-cell identifier and a first corresponding radio strength or a neighbor cell identifier and a second corresponding radio strength, with at least one of an expected macro-cell identifier and a first expected corresponding radio strength or an expected neighbor cell identifier and a second expected corresponding radio strength;
   receiving and maintaining trust related credentials via a remote provisioning upon the platform validation procedure being successful, the trust related credentials enabling the adjustment of one or more secure parameters of a configuration of the HeNB, the condition that the platform validation procedure is successful including determining a location of the HeNB is substantially similar to a location that was determined during a previous platform validation procedure; and
   triggering a locking function upon the platform procedure being unsuccessful, the condition that the platform validation procedure is not successful including determining a location of the HeNB is different from a location that was determined during a previous platform validation procedure.

26. The method of claim 25, wherein the condition that the platform validation is successful further includes a verification successful message being received in response to the attestation.

27. The method of claim 25, wherein the determining the location of the H(e)NB includes verifying a current neighbor list.

28. The method of claim 25, wherein the determining the location of the H(e)NB includes using an Internet Protocol (IP) address.

29. The method of claim 25, wherein the triggering the locking function further comprises enforcing the locking function at the hardware level or enforcing the locking function by trusted computing techniques.

30. The method of claim 25, wherein the triggering the locking function upon a user attempt to reconfigure H(e)NB parameters without authority further comprises performing at least one of stopping, shutting down, reducing the offered services, restricting admission control, resetting configuration parameters by sending operational and maintenance (O&M) signaling or control plane (C-plane) signaling to the operator, sending warning messages to the operator, or directly contacting the operator.

31. The method of claim 25, wherein the triggering the locking function further comprises allowing wireless transmit/receive units (WTRU)s to connect to the H(e)NB only if the WTRUs are subscribed with the H(e)NB carrier.

32. The method of claim 25, wherein the triggering the locking function further comprises ensuring that the H(e)NB can be unlocked when predetermined criteria for operation are met.

33. The method of claim 25, wherein the triggering the locking function further comprises receiving an unlock command or a locking command.

34. The method of claim 25, wherein the method further comprises detecting a change in a location of the H(e)NB, and the detecting the change in the location comprises comparing at least one of a surrounding macro-cell identifier and neighbor cell identifier along with a corresponding radio strength, with at least one of an expected macro-cell identifier parameter and an expected neighbor cell identifier, and an expected corresponding radio strength.

35. The method of claim 25, wherein the method further comprises detecting a change in a location of the H(e)NB, and the detecting the change in the location comprises comparing a stored location parameter with at least one of a served wireless transmit/receive unit (WTRU) location, or a neighboring cell WTRU location.

36. The method of claim 25 further comprising transmitting a request to update a neighbor list if a neighboring cell has changed and a H(e)NB location has not changed.

* * * * *